United States Patent [19]

Boitiaux et al.

[11] Patent Number: 4,490,481
[45] Date of Patent: Dec. 25, 1984

[54] SUPPORTED PALLADIUM-GOLD CATALYST, AND ITS MANUFACTURE

[75] Inventors: Jean-Paul Boitiaux, Paris; Jean Cosyns, Maule, both of France

[73] Assignee: Sté Francaise des Produits pour Catalyse chez Institut Francais du Petrole, Rueil-Malmaison, France

[21] Appl. No.: 475,651

[22] Filed: Mar. 15, 1983

[30] Foreign Application Priority Data

Mar. 15, 1982 [FR] France .................................. 82 04477

[51] Int. Cl.$^3$ .......................... B01J 23/58; B01J 31/02; B01J 27/24; B01J 27/06
[52] U.S. Cl. ..................................... 502/330; 502/167; 502/174; 502/200; 502/224
[58] Field of Search ............... 502/167, 174, 200, 224, 502/330

[56] References Cited

U.S. PATENT DOCUMENTS

| | | | |
|---|---|---|---|
| 3,769,201 | 10/1973 | Sinfelt et al. | 502/330 X |
| 3,775,342 | 11/1973 | Kronig et al. | 502/330 X |
| 3,789,020 | 1/1974 | Carter et al. | 502/330 |
| 3,816,337 | 6/1974 | Usami et al. | 502/174 |
| 3,878,126 | 4/1975 | Antonelli et al. | 502/330 X |
| 3,932,548 | 1/1976 | Rausch | 502/330 X |
| 3,974,102 | 8/1976 | Kaiser | 252/466 J |
| 4,000,207 | 12/1976 | Kaiser | 502/330 X |
| 4,136,062 | 1/1979 | Boudart et al. | 252/460 |
| 4,199,436 | 4/1980 | Courty | 502/330 X |
| 4,201,661 | 5/1980 | Juguin et al. | 502/330 X |

FOREIGN PATENT DOCUMENTS

| | | | |
|---|---|---|---|
| 2482953 | 5/1980 | France | 252/466 J |
| 802100 | 10/1958 | United Kingdom | 252/466 J |

*Primary Examiner*—William G. Wright
*Attorney, Agent, or Firm*—Millen & White

[57] ABSTRACT

Supported palladium-gold catalyst of high resistance to poisoning by sulfur compounds, not subject to elution by vinylacetylene and not inducing a substantial formation of oligomers, for use in hydrogenation reactions wherein acetylenics and diolefins are selectively hydrogenated, said catalyst being obtained by the steps of: admixing a palladium compound with an inorganic carrier, roasting in the presence of an oxygen-containing gas, treating with a reducing agent, admixing a halogenated gold compound with the resulting composition, treating with a reducing agent, treating with a compound having a basic reaction so as to lower the halogen content of the catalyst below 10 ppm by weight, and roasting, in the presence of an oxygen-containing gas, the palladium and gold compounds being used in convenient proportions so that the catalyst contains 0.03 to 1% palladium and 0.003 to 0.3% gold by weight.

20 Claims, No Drawings

SUPPORTED PALLADIUM-GOLD CATALYST, AND ITS MANUFACTURE

BACKGROUND OF THE INVENTION

The present invention concerns the manufacture of a selective, stable and sulfur resistant palladium-gold catalyst, as well as its use in the selective hydrogenation of diolefinic and/or acetylenic hydrocarbons.

The processes for the conversion of hydrocarbons at high temperatures, such for example as steam cracking, visbreaking, coking and catalytic cracking, produce a large amount of gaseous and liquid olefinic and diolefinic unsaturated hydrocarbons such as, for example, ethylene, propylene, butadiene, butenes as well as hydrocarbons boiling in the range of gasolines and having also a high content of diolefinic and olefinic components.

The gaseous olefinic and diolefinic hydrocarbons with two to four carbon atoms obtained by these processes also contain a certain amount of acetylenic hydrocarbons. The content in these hydrocarbons varies in accordance with the severity of the conversion treatment but is always too low for making is reasonably possible to separate and use them in, for example, petrochemical processes. However, their presence in addition to olefinic and diolefinic hydrocarbons makes impossible to upgrade the latter. Accordingly, only their use as mere fuel could be contemplated and this use is more and more ruled out for obvious economical reasons.

There is accordingly an attempt to use light olefinic hydrocarbons either as petrochemical bases or as fuel components.

Thus, for example, propylene obtained from catalytic cracking may be used as monomer for producing polypropylene or as reactant in the production of dimers forming an excellent fuel base.

Thus, in a general manner, the upgradings in petrochemistry or as fuel make necessary a selective hydrogenation treatment so as to selectively convert the most unsaturated impurities such, for example, as the acetylenics in the olefinic and diolefinic cuts or the diolefins in the olefinic cuts.

However, the new developments, mainly in connection with the oil crisis, pose new problems in the field of hydrogenation which cannot be satisfactorily solved with the present catalysts.

A first problem is connected with the development of the processes for converting heavy oils at high temperatures, such as visbreaking, coking or catalytic cracking, which generate olefinic cuts of higher content in heteroatomic impurities such as sulfur compounds. Whereas the light cuts ($C_2$, $C_3$, $C_4$) issued from these processes were previously used essentially as fuel, it is now desired to better upgrade them by converting them, either to basic products for chemistry, or to a fuel base.

This requires the use of selective hydrogenation treatments. However, the presence of sulfur-containing impurities results in a progressive poisoning of the most currently used catalysts such as supported palladium and makes it necessary either to considerably increase the catalyst amount or to proceed to numerous regenerations of high power cost.

A second problem, also connected with the requirement of better upgrading the oil cuts also appeared. Thus, the necessity to increase the yields to olefins has led to an increase of the operating temperatures of the steam-cracking furnaces; this has led in the various cuts so produced, to a higher content of acetylenic and diolefinic compounds. In particular, the raw steam-cracking $C_4$ cut contains, in addition to butadiene and butenes, a relatively high proportion of vinylacetylene (1 to 2% by weight). This results, when effecting the extractive distillation of butadiene, in a substantial loss of said compound which is used to dilute the acetylenic concentrate issuing from the bottom of the column. This dilution is made necessary for security reasons and this cut which, unhappily, cannot be subjected to a proper chemical upgrading, is generally burned at the present time.

In order to decrease said butadiene loss, it is thus desirable to previously hydrogenate vinylacetylene so as to lower its content as much as possible while tolerating only the smallest possible butaiene loss. The conventional catalysts with a palladium base provide, under certain conditions, for butadiene yields of 99% or more with respect to the butadiene input in the hydrogenation reactor.

However, it is observed that this type of catalyst deactivates relatively quickly as a result of a progressive leaching of palladium by the charge; this metal leaching is the higher as the vinylacetylene content of the charge is higher.

The third problem encountered is also connected with the increase of the acetylenic hydrocarbons concentration in the light steam-cracking cuts. As a matter of fact, with the conventionally used palladium catalyst, an oligomer formation, parallel to the hydrogenation, has been observed, said formation being the more substantial as the acetylenics content to hydrogenate is higher. This parasitic reaction has a double disadvantage, the first being to lower the yield to the desired olefinic product (case of propylene for example), the second being a progressive clogging of the catalyst which requires frequent regenerations (case of gaseous phase hydrogenation of $C_2$).

To summarize, the usual palladium catalysts suffer from three main disadvantages:
the first resulting from their too high sensitivity to poisoning by sulfur compounds,
the second being the progressive dissolution of palladium in the $C_4$ cuts containing vinylacetylene,
the third resulting from the too substantial formation of oligomers.

The use, for the selective hydrogenation, of catalysts containing palladium and gold has been proposed (FR No. 2 482 953, GB No. 802 100). Gold is introduced as chloroauric acid. These catalysts are more active and more selective than catalysts containing palladium alone, but palladium tends to be quickly removed from the catalyst by the acetylenic hydrocarbons such as vinylacetylene. In addition, the oligomer formation is substantial. Catalysts may be prepared by simultaneously introducing palladium and gold in a carrier and by taking care to avoid the presence of chlorine in the final catalyst (U.S. Pat. No. 3,974,102 and U.S. Pat. No. 4,136,062); the activity of these catalysts is not satisfactory.

The object of the invention is the preparation of a catalyst having simultaneously a high resistance to poisoning by sulfur, a high stability with respect to elution by vinylacetylene, as well as a low tendency to oligomers formation.

SUMMARY OF THE INVENTION

The process for manufacturing a catalyst according to the invention comprises the following steps: incorporation of a palladium compound to an inorganic carrier, roasting in the presence of oxygen, treatment with a reducing agent, introduction of a halogenated gold compound, treatment with a reducing agent, treatment with a compound having a basic reaction and roasting in the presence of oxygen.

The halogen content of the catalyst is thus decreased below 10 ppm (parts per million) by weight.

The palladium content by weight of the catalyst is advantageously comprised between 0.03 and 1% and its gold content by weight between 0.003 and 0.3%.

DETAILED DISCUSSION

The carrier may be one of the hydrogenation catalyst carriers known in the art, for example silica or alumina. Alumina is preferred, more particularly an alumina of a surface ranging from 1 to 100 $m^2/g$.

The palladium compound may be one of the known compounds of said metal, preferably a compound soluble in a solvent such as water, alcohol or a hydrocarbon, for example a nitrate, a chloride or an acetylacetonate.

The gold compound is a halide, particularly a chloride, used for example as a solution in water, in an alcohol or in an acid (hydrochloric acid, nitric acid, etc, or their mixture).

The roasting in the presence of oxygen, for example in the presence of air, may be conducted at about 100°–500° C., preferably at about 250°–350° C.

The reduction may be effected either at low temperature, by means, for example, of hydrazine or formic acid, or at a higher temperature by effecting a reduction with hydrogen.

Reductions with hydrogen may be conducted at 100°–400° C., preferably 150°–300° C.

The reduction in liquid phase by hydrazine or formic acid may be effected at a temperature comprised, for example, between 10° and 100° C.

The treatment with a compound having a basic reaction, for example an aqueous solution of ammonia (preferred technique), an amine or sodium, potassium or ammonium carbonate or bicarbonate, may be effected for example at 0°–100° C. or above, provided that the operation is conducted under pressure.

After washing with an ammonia solution or another basic agent, drying and roasting are effected, for example, between 100° and 500° C., preferably between 250° and 350° C., as already mentioned.

A preferred mode of preparation of the catalyst is described hereinafter by way of example:

The carrier, preferably alumina, is treated with a solution of a palladium compound, dried, roasted and reduced with hydrogen. The following steps consist of an impregnation with an aqueous alcoholic or hydroalcoholic solution of chloroauric acid, a reduction, preferably by hydrazine or formic acid, the treatment with the compound having a basic reaction, then drying and roasting.

Before use, it is convenient to effect a reduction by one of the known methods, for example, by means of hydrogen at a temperature from 100° to 400° C., preferably from 150° to 250° C.

The following non-limitative examples illustrate the invention.

The scanning transmission electronic microscopy (STEM) coupled with an X-ray analyser indicates the presence of bi-metallic palladium-gold particles on the catalysts, B, C, D, F and G.

EXAMPLE 1

In this example, the selected carrier is alumina, as balls of 2 to 4 mm diameter, having a specific surface of 70 $m^2/g$, a total pore volume of 0.6 cc/g and an average pore diameter of 200 angströms ($200 \times 10^{-10}$ m).

The carrier is dipped in an amount of palladium acetylacetonate benzenic solution of three times its pore volume and whose concentration has been calculated so as to obtain a final catalyst with a 0.2% by weight content of this metal. After standing 8 hours, the supernatant solution is analyzed, showing a palladium concentration of the order of 100 ppm by weight, which indicates that almost the entirety of palladium acetylacetonate has formed a complex with the carrier.

The supernatant solution is removed and the catalyst is dried in a ventilated stove at 120° C., for 6 hours. Then the catalyst is transferred to a tubular furnace where it is maintained in an air stream at 300° C. for 2 hours. In the same furnace, the air is scavenged by nitrogen and then replaced by a hydrogen stream which scavenges the catalyst for 2 hours at a temperature of 300° C. Catalyst A is thus obtained.

A sample of catalyst (A) is then dipped in an amount of a tetrachloroauric acid (H Au $Cl_4$) aqueous solution equal to three times its pore volume and whose concentration has been so selected as to obtain a final catalyst having a 0.02% by weight gold content. The whole is maintained at rest until complete discoloration of the supernatant solution. After 3 hours, the solution is analyzed by atomic absorption: gold is undetectable ($\leq 10$ ppm).

The supernatant solution is removed and the catalyst is then dried, roasted and reduced in the same manner as the palladium catalyst. The so-prepared catalyst is analyzed by X-ray fluorescence; it contains 110 ppm by weight of chlorine and constitutes the catalyst referred to as B in Table 1.

A portion of this catalyst is then washed with a normal solution of $NH_4OH$, so as to remove chlorine almost completely. The operation is then discontinued when no more chlorine ions are detected in the washing solution (absence of turbidity when adding silver nitrate).

After washing with distilled water, the catalyst is then dried, roasted and reduced under the same conditions as the palladium catalyst. There is thus obtained catalyst C of Table 1. The X-ray fluorescence analysis of this catalyst indicates a chlorine content lower than 10 ppm by weight.

These three catalysts A, B and C are used to hydrogenate continuously and in gaseous phase a charge containing 10% of isoprene diluted in n-heptane.

The operating conditions are as follows:

Atmospheric pressure, temperature of 100° C., feed rate: 60 cc/h, hydrogen flow rate: 25 l/h, catalyst charge: 1.5 g. The results obtained with a sulfur-free charge are the following (Table 1).

The activity is expressed in moles of isoprene converted per hour and per gram of catalyst.

TABLE 1

| CATALYST | COMPOSITION | ACTIVITY (Isoprene→Methylbutenes) |
|---|---|---|
| A | 0.2% palladium | $7 \cdot 10^{-3}$ moles/h/g catalyst |
| B | 0.02% palladium 0.02% gold and 110 ppm chlorine | $11.5 \cdot 10^{-3}$ mole/h/g catalyst |
| C | 0.2% palladium 0.02% gold and 10 ppm chlorine | $14 \cdot 10^{-3}$ mole/h/g catalyst |

The selectivity to methylbutenes for the above three catalysts was 98%.

EXAMPLE 2

The three catalysts A, B and C of the preceding preparation were tested under the same conditions with the same charge, but having a 1000 ppm by weight thiophene content. The results obtained are reported in Table 2.

TABLE 2

| CATALYST | ACTIVITY (Isoprene→Methylbutenes) |
|---|---|
| A | $2.7 \cdot 10^{-3}$ moles/h/g catalyst |
| B | $6.1 \cdot 10^{-3}$ moles/h/g catalyst |
| C | $8.2 \cdot 10^{-3}$ moles/h/g catalyst |

The selectivity to methylbutenes, for the above three catalysts, was 98%.

EXAMPLE 3

Dechlorinated palladium-gold catalysts (<10 ppm of chlorine) with variable gold contents and a palladium content maintained at 0.2% by weight, are prepared according to the method of example 1 (catalyst C).

1.5 g of these reduced catalysts are crushed and introduced in a stirred reactor of the Grignard type. Their activity is tested in the hydrogenation of 1-butyne dissolved in n-heptane under 8 bars of total pressure at 20° C.

Table 3 indicates the influence of the gold content on the activity of the catalysts in the hydrogenation of 1-butyne to 1-butene.

TABLE 3

| CATALYST | 0.2% Pd | 0.2% Pd + 0.02% Au | 0.2% Pd + 0.03% Au | 0.2% Pd + 0.1% Au |
|---|---|---|---|---|
| Activity 1-Butyne→1-Butene $10^{-3}$ moles/h/g catalyst | 5.5 | 14.4 | 14.8 | 12.0 |

The reaction of hydrogenation of 1-butyne to butene is substantially selective at 100% as long as all the butyne is not consumed. When the latter has disappeared, the hydrogenation is continued by converting 1-butene to butane.

Table 4 shows the influence of gold on the rate of this consecutive reaction.

TABLE 4

| CATALYST | 0.2% Pd | 0.2% Pd + 0.02% Au | 0.2% Pd + 0.03% Au | 0.2% Pd + 0.1% Au |
|---|---|---|---|---|
| Activity 1-Butene→butane $10^{-3}$ mole/h/g catalyst | 55 | 47.5 | 40 | 31 |

It is observed that the addition of gold decreases the hydrogenation rate of 1-butene to butane, while flavoring the hydrogenation of 1-butyne to 1-butene.

Gold addition to palladium thus results in an increase of the selectivity in the production of olefin by reducing to a minimum the formation of paraffin.

EXAMPLE 4

Catalysts prepared as in example 1 (catalyst C) are used to selectively hydrogenate diolefins to olefins in a steam-cracking gasoline.

The reaction is conducted in fixed bed at 100° C., under a pressure of 30 bars at a liquid space velocity of 8 volumes/volume of catalyst per hour.

The performance of the catalyst is followed by measuring the "Maleic Anhydride Value" or M.A.V. according to the UOP method No. 326-58, the M.A.V. being proportional to the diolefins content.

The hydrogenation rate is deduced therefrom by the following relationship:

$$\text{Activity } (h^{-1}): V.V.H. \log \cdot \frac{MAV_o}{MAV_p}$$

with $MAV_o$=MAV of the charge and $MAV_p$=MAV of the product.

The charge was a 40°–180° C. gasoline cut of specific gravity 0.827 and $MAV_o$ of 137. Its total composition was 9% of paraffins, 7% of olefins, 18% of diolefins and 66% of aromatics.

Table 5 shows the influence of the gold content on the hydrogenating activity of catalysts with 0.2% of palladium.

TABLE 5

| GOLD CONTENT % BY WEIGHT | 0 | 0.03 | 0.05 | 0.1 |
|---|---|---|---|---|
| HYDROGENATING ACTIVITY $h^{-1}$ | 4.3 | 5.8 | 7.2 | 4.6 |

EXAMPLE 5

A $C_4$ cut containing 48% of butadiene and 1.4% of vinylacetylene (VAC) is treated continuously with hydrogen at a temperature of 40° C. and under a pressure of 8 bars to selectively hydrogenate vinylacetylene. The space velocity of the liquid $C_4$ cut is 5 volumes/volume of catalyst per hour and the hydrogen molar ratio to VAC is 1.1.

Three catalysts prepared as indicated in example 1 (catalysts A, B, C) are tested for 800 hours under these conditions. At the end of this period, their palladium content is measured.

The following Table 6 indicates the contents before and after the test:

TABLE 6

| CATALYST | PALLADIUM CONTENT OF THE NEW CATALYST | PALLADIUM CONTENT OF THE USED CATALYST |
|---|---|---|
| 0.2% Palladium | 0.2 | 0.1 |
| 0.2% Palladium + 0.03% non-dechlorinated gold | 0.2 | 0.12 |
| 0.2% Palladium + 0.03% dechlorinated gold (<10 ppm chlorine) | 0.2 | 0.19 |

It appears that the dechlorinated Pd—Au catalyst is more stable than the two other catalysts.

EXAMPLE 6

A $C_2$ cut containing 0.5% by weight of acetylene in ethylene is treated with hydrogen at a temperature of 100° C. under a pressure of 25 bars, the molar ratio $H_2$/HC being maintained at 4 at the inlet of the reactor and the gas space velocity being 6000 $h^{-1}$, for selectively hydrogenating acetylene.

For a residual acetylene content of 700 ppm by weight, at the outlet of the reactor, the residual heavy oils content varies according to the type of catalyst used.

For a 0.2% palladium content on alumina (catalyst A), 500 ppm of oligomers are recovered whereas with a dechlorinated catalyst with 0.2% palladium and 0.1% gold, prepared as in example 1, this oligomerization is reduced to 200 ppm.

EXAMPLE 7

A portion of catalyst B prepared in example 1, after the drying treatment, is impregnated with an aqueous solution of sodium carbonate so as to deposit an amount of 0.6% by weight of sodium (0.006 g per gram) with respect to the starting alumina. The catalyst is dried again, roasted and reduced under the conditions of example 1.

The so-prepared catalyst is tested in the hydrogenation of isoprene under the same conditions as those of example 1. The obtained activity (isoprene→methylbutenes) is found equal to $12.5 \cdot 10^{-3}$ mole/h/g of catalyst.

The methylbutenes amount to 96% of the hydrogenation product.

It appears that this activity is clearly lower than that of catalyst C (Table 1) for which a washing with ammonia has been effected.

EXAMPLE 8

The selected alumina carrier for this example is identical to that of example No. 1.

A sample of said carrier is dipped in an aqueous solution of palladium nitrate of a volume equal to the pore volume and whose concentration has been calculated so as to obtain a final catalyst with a 0.2% content by weight of said metal. After 8 hours of rest, period at the end of which the catalyst is dried in a stove at 120° C. for 6 hours, it is roasted in a dry air stream for 2 hours at 300° C. in a tubular reactor. In the same furnace, air is scavenged by nitrogen and then replaced with a hydrogen stream which scavenges the catalyst for 2 hours at 150° C.

The obtained solid is then dipped into an amount of tetrachloroauric acid aqueous solution equal to the pore volume of the carrier and whose concentration has been so selected as to obtain a final catalyst having a 0.02% by weight gold content. The whole is maintained at rest until complete discoloration of the supernatant solution. The obtained solid is dried, roasted at 300° C., then reduced at 150° C. for 2 hours in a hydrogen stream.

The obtained solid is then washed with an ammonia solution as in example 1 in order to remove chlorine residues still present and then dried, roasted and reduced as precedingly.

Catalyst D of Table 7 is thus obtained.

EXAMPLE 8 bis (comparison)

Another sample of the alumina carrier of example 1 is dipped in a mixed aqueous solution of palladium nitrate and tetrachloroauric acid at respective concentrations so selected that the final content of the obtained catalyst be 0.2% by weight of palladium and 0.02% by weight of gold. The amount of solution is equal to the pore volume of the carrier.

The solution is maintained in contact with the carrier for 8 hours and, after that, the obtained solid is dried in a stove at 120° C. for 6 hours. After drying, the solid is transferred to a tubular furnace, roasted for 2 hours in dry air at 300° C., then reduced for 2 hours at 150° C. in a hydrogen stream.

The obtained solid is washed in the same manner as in example 1 by an ammonia solution, dried, roasted at 300° C. and then reduced at 150° C. for 2 hours in a hydrogen stream. The obtained catalyst is catalyst E of Table 7.

Catalysts D and E are tested in the hydrogenation of isoprene under the same conditions as in example 1. The hydrogenation products are methylbutenes at 98% for both catalysts.

The obtained results are summarized in Table 7.

TABLE 7

| CATALYST | Activity: Isoprene→Methylbutenes |
| --- | --- |
| D | $14.2 \cdot 10^{-3}$ moles/h/g catalyst |
| E | $6.5 \cdot 10^{-3}$ moles/h/g catalyst |

EXAMPLE 9

In this example, the selected carrier is an alumina identical to that of example 1.

This carrier is impregnated with 0.2% of palladium in the same manner as for the preparation of catalyst D of example 8 and the operation is conducted in the same manner up to the roasting in dry air to 300° C. before gold introduction.

The roasted solid is reduced at room temperature by an excess of hydrazine aqueous solution at 3% by weight.

At the end of the gas evolution, the reduction is considered complete; the hydrazine excess is removed and the obtained solid is washed with distilled water.

Then, the impregnation with gold is conducted with an aqueous solution of tetrachloroauric acid, the volume of the solution being equal to the pore volume. The concentration of this solution is so selected as to obtain 0.02% of gold in the final catalyst.

The whole is maintained at rest until complete discoloration of the supernatant solution.

The obtained solid is then reduced again with hydrazine diluted in water. After washing with distilled water, the catalyst is washed with the same ammonia solution as in example 1. The obtained solid is filtered, dried for six hours in a stove at 120° C., then transferred into a tubular reactor. The catalyst is then roasted in dry air for 2 hours at 300° C., then reduced in a hydrogen stream for 2 hours at 150° C. Catalyst F is thus obtained.

Catalyst F, tested under the same conditions as in example 1 has an activity of $13.7 \cdot 10^{-3}$ mole/h/g catalyst (98% selectivity).

EXAMPLE 10

The operation is conducted in the same manner as in example 9 except that hydrazine is replaced with an excess of a 0.1% formic acid aqueous solution, all other steps being maintained unchanged.

Catalyst G is thus obtained. Catalyst G, tested under the same conditions as in example 1, shows an activity of 14.5. $10^{-3}$ mole/h/g catalyst (98% selectivity).

What is claimed is:

1. A catalyst produced by a process consisting essentially of the sequential steps of: admixing a palladium compound with an inorganic carrier, roasting in the presence of an oxygen-containing gas, treating with a reducing agent, admixing a halogenated gold compound with the resultant composition, treating with a reducing agent, washing with an aqueous solution of a compound having a basic reaction so as to lower the halogen content of the catalyst below 10 ppm by weight, and roasting in the presence of an oxygen-containing gas, the palladium and gold compounds being used in amounts such that the resultant catalyst contains 0.03 to 1% palladium and 0.003 to 0.3% gold by weight.

2. A catalyst according to claim 1, wherein the compound having a basic reaction is ammonia, an amine or an ammonium, sodium or potassium carbonate or bicarbonate.

3. A catalyst according to claim 2, wherein the compound having a basic reaction is ammonia.

4. A catalyst according to claim 1, wherein the roasting steps are effected at 100°–500° C.

5. A catalyst according to claim 1, wherein the reducing agent is hydrogen, used at 100°–400° C.

6. A catalyst according to claim 1, wherein the reducing agent is formic acid or hydrazine, used at 10°–100° C.

7. A catalyst according to claim 1, wherein palladium is introduced as acetylacetonate.

8. A catalyst according to claim 1, wherein the carrier is an alumina having a surface of between 1 and 100 m²/g.

9. A catalyst according to claim 1, obtained by admixing a palladium compound with an inorganic carrier, roasting at 100°–500° C. in the presence of an oxygen-containing gas, treating with a reducing agent selected from formic acid, hydrazine and hydrogen, admixing a halogenated gold compound with the resultant composition, treating with formic acid or hydrazine as reducing agent at 10°–100° C., washing with an aqueous solution of a compound having a basic reaction selected from ammonia, an amine and an ammonium, sodium or potassium carbonate or bicarbonate, so as to lower the halogen content of the catalyst below 10 ppm by weight, and roasting at 100°–500° C. in the presence of an oxygen-containing gas, the palladium and gold compounds being used in sufficient amounts to provide the resultant catalyst with 0.03 to 1% palladium and 0.003 to 0.3% gold by weight.

10. A catalyst according to claim 1, obtained by admixing a palladium compound with an inorganic carrier, roasting at 100°–500° C. in the presence of an oxygen-containing gas, treating with a reducing agent selected from formic acid, hydrazine and hydrogen, admixing a halogenated gold compound with the resultant composition, roasting at 100°–500° C. in the presence of an oxygen-containing gas, treating with hydrogen at 100°–400° C., washing with an aqueous solution of a compound having a basic reaction selected from ammonia, an amine, and an ammonium, sodium or potassium carbonate or bicarbonate, so as to lower the halogen content of the catalyst below 10 ppm by weight, and roasting at 100°–500° C. in the presence of an oxygen-containing gas, the palladium and gold compounds being used in sufficient amounts to provide the resultant catalyst with 0.03 to 1% palladium and 0.003 to 0.3% gold by weight.

11. A process for producing a catalyst containing palladium and gold, consisting essentially of the sequential steps of: admixing a palladium compound with an inorganic carrier, roasting in the presence of an oxygen-containing gas, treating with a reducing agent, admixing a halogenated gold compound with the resultant composition, treating with a reducing agent, washing with an aqueous solution of a compound having a basic reaction so as to lower the halogen content of the catalyst below 10 ppm by weight, and roasting in the presence of an oxygen-containing gas, the palladium and gold compounds being used in amounts such that the resultant catalyst contains 0.03 to 1% palladium and 0.003 to 0.3% gold by weight.

12. A process according to claim 11, wherein the compound having a basic reaction is ammonia, an amine or an ammonium, sodium or potassium carbonate or bicarbonate.

13. A process according to claim 12, wherein the compound having a basic reaction is ammonia.

14. A process according to claim 11, wherein the roasting steps are effected at 100°–500° C.

15. A process according to claim 11, wherein the reducing agent is hydrogen, used at 100°–400° C.

16. A process according to claim 10, wherein the reducing agent is formic acid or hydrazine, used at 10°–100° C.

17. A process according to claim 11, wherein palladium is introduced as acetylacetonate.

18. A process according to claim 11, wherein the carrier is an alumina having a surface of between 1 and 100 m²/g.

19. A process according to claim 11 for producing a catalyst containing palladium and gold, consisting essentially of the sequential steps of: admixing a palladium compound with an inorganic carrier, roasting at 100°–500° C. in the presence of an oxygen-containing gas, treating with a reducing agent selected from formic acid, hydrazine and hydrogen, admixing a halogenated gold compound with the resultant composition, treating with formic acid or hydrazine as reducing agent at 10°–100° C., washing with an aqueous solution of a compound having a basic reaction selected from ammonia, an amine and an ammonium, sodium or potassium carbonate or bicarbonate, so as to lower the halogen content of the catalyst below 10 ppm by weight, and roasting at 100°–500° C., in the presence of an oxygen-containing gas, the palladium and gold compounds being used in sufficient amounts to provide the resultant catalyst with 0.03 to 1% palladium and 0.003 to 0.3% gold by weight.

20. A process according to claim 11 for producing a catalyst containing palladium and gold, consisting essentially of the sequential steps of: admixing a palladium compound with an inorganic carrier, roasting at 100°–500° C. in the presence of an oxygen-containing gas, treating with a reducing agent selected from formic acid, hydrazine and hydrogen, admixing a halogenated gold compound with the resultant composition, roasting at 100°–500° C. in the presence of an oxygen-containing gas, treating with hydrogen at 100°–400° C., washing with an aqueous solution of a compound having a basic reaction selected from ammonia, an amine, and an ammonium, sodium or potassium carbonate or bicarbonate, so as to lower the halogen content of the catalyst below 10 ppm by weight, and roasting at 100°–500° C. in the presence of an oxygen-containing gas, the palladium and gold compounds being used in sufficient amounts to provide the resultant catalyst with 0.03 to 1% palladium and 0.003 to 0.3% gold by weight.

* * * * *